(12) United States Patent
Kelly et al.

(10) Patent No.: US 7,823,897 B2
(45) Date of Patent: Nov. 2, 2010

(54) VEHICULAR DRIVE SYSTEM WITH FWD-ONLY MODE AND ASSOCIATED METHOD

(75) Inventors: Andrew Wayne Kelly, Sherrill, IA (US); Brent Allen Smith, Peosta, IA (US); Scott Joseph Breiner, Dubuque, IA (US); Craig Ronald Timmerman, Dickeyville, WI (US)

(73) Assignee: Deere & Company, Moline, IL (US)

( * ) Notice: Subject to any disclaimer, the term of this patent is extended or adjusted under 35 U.S.C. 154(b) by 686 days.

(21) Appl. No.: 11/626,877

(22) Filed: Jan. 25, 2007

(65) Prior Publication Data

US 2008/0083578 A1 Apr. 10, 2008

Related U.S. Application Data

(60) Provisional application No. 60/849,357, filed on Oct. 4, 2006.

(51) Int. Cl.
*B60K 17/34* (2006.01)
(52) U.S. Cl. .................. 280/233; 280/243; 280/244
(58) Field of Classification Search .................. 180/233, 180/243, 245
See application file for complete search history.

(56) References Cited

U.S. PATENT DOCUMENTS

| | | | |
|---|---|---|---|
| 3,997,017 A | 12/1976 | Campbell et al. | |
| 4,069,886 A | 1/1978 | Campbell et al. | |
| 4,071,106 A | 1/1978 | Junck et al. | |
| 4,177,870 A | 12/1979 | Henn | |
| 4,183,419 A * | 1/1980 | Henn et al. | 180/243 |
| 4,218,934 A | 8/1980 | Demorest et al. | |
| 4,249,782 A | 2/1981 | Frank | |
| 4,373,409 A | 2/1983 | Benedek et al. | |
| 4,417,641 A * | 11/1983 | Kageyama | 180/247 |
| 4,429,593 A | 2/1984 | Michael | |
| 4,444,286 A * | 4/1984 | Hawkins et al. | 180/197 |
| 4,480,502 A * | 11/1984 | Nembach | 180/243 |
| 4,523,493 A | 6/1985 | Weiβ | |
| 4,615,240 A | 10/1986 | Weiss | |
| 4,651,846 A * | 3/1987 | Headrick | 180/243 |
| 4,792,010 A * | 12/1988 | Kitao et al. | 180/233 |
| 4,852,659 A | 8/1989 | Ross et al. | |
| 4,869,337 A | 9/1989 | Wagner | |
| 4,914,592 A | 4/1990 | Callahan et al. | |

(Continued)

OTHER PUBLICATIONS

Background Information (one page) (prior art).

(Continued)

*Primary Examiner*—Kevin Hurley
*Assistant Examiner*—Maurice Williams

(57) ABSTRACT

A drive system for a work vehicle comprises a control unit adapted to: monitor output of a speed ratio setting input device for a speed ratio setting request signal and output of a drive-request input device for a FWD-only request signal, determine from the speed ratio setting request signal if a requested speed ratio setting represented thereby is one of at least one predetermined speed ratio setting among a plurality of speed ratio settings possible for the work vehicle upon receipt of the FWD-only request signal, and, if so, output at least one control signal engaging a FWD-only mode enabling FWD operation of the work vehicle but disabling RWD operation of the work vehicle. An associated method is disclosed.

23 Claims, 3 Drawing Sheets

U.S. PATENT DOCUMENTS

| | | |
|---|---|---|
| 5,361,208 A | 11/1994 | Olson et al. |
| 5,420,791 A | 5/1995 | Olson et al. |
| 5,489,007 A | 2/1996 | Yesel |
| 5,564,519 A * | 10/1996 | Katoh et al. ............... 180/243 |
| 6,466,855 B2 * | 10/2002 | Yamaguchi ................. 701/70 |
| 6,508,328 B1 | 1/2003 | Kenyon et al. |
| 6,644,429 B2 | 11/2003 | Evans et al. |
| 6,851,495 B2 | 2/2005 | Sprinkle et al. |
| 6,857,494 B2 | 2/2005 | Kobayashi et al. |
| 7,237,639 B2 * | 7/2007 | Kowatari et al. ............ 180/243 |
| 7,373,776 B2 | 5/2008 | Burgart et al. |
| 7,549,498 B2 | 6/2009 | Lunzman et al. |
| 2002/0027025 A1 | 3/2002 | Kobayashi et al. |
| 2006/0065465 A1 | 3/2006 | Lunzman et al. |

OTHER PUBLICATIONS

Motor Grader Schematic (one page) (prior art).

* cited by examiner

VEHICULAR DRIVE SYSTEM WITH FWD-ONLY MODE AND ASSOCIATED METHOD

This application claims the benefit under 35 U.S.C. §119 (e) of U.S. Provisional Patent Application No. 60/849,357, which was filed 4 Oct. 2006 and is hereby incorporated by reference herein.

FIELD OF THE DISCLOSURE

The present disclosure relates to vehicular drive systems and methods associated therewith.

BACKGROUND OF THE DISCLOSURE

A variety of drive systems may be used to propel work vehicles. For example, there are front-and-rear-wheel-drive (FWD-and-RWD) systems (e.g., all-wheel drive or less than all-wheel drive), front-wheel-drive (FWD) systems, and rear-wheel-drive (RWD) systems.

A typical drive system for motor graders allows operation of the motor grader in a FWD-and-RWD mode, a FWD-only mode (may also be referred to as "precision mode" or "creep mode"), or a RWD-only mode. The drive system may be switched between these modes.

The FWD-only mode allows operation of the motor grader at reduced speeds which may be particularly useful for maneuvering in relatively tight areas (e.g., in a cul-de-sac), fine grading, and milling through pavement, to name just a few possible uses. However, at least in some cases, the motor grader must be stationary to engage FWD-only mode. Thus, in such cases, an operator desiring to engage FWD-only mode must first stop the motor grader before engaging FWD-only mode, adding to the work load of the operator and decreasing overall productivity.

SUMMARY OF THE DISCLOSURE

According to the present disclosure, there is provided a drive system for a work vehicle. The drive system comprises a speed ratio setting input device, a drive-request input device, and a control unit arranged for communication with the speed ratio setting input device and the drive-request input device. The control unit is adapted to: monitor output of the speed ratio setting input device for a speed ratio setting request signal and output of the drive-request input device for a FWD-only request signal, determine from the speed ratio setting request signal if a requested speed ratio setting represented thereby is one of at least one predetermined speed ratio setting among a plurality of speed ratio settings possible for the work vehicle upon receipt of the FWD-only request signal, and, if so, output at least one control signal engaging a FWD-only mode enabling FWD operation of the work vehicle but disabling RWD operation of the work vehicle.

In this way, exemplarily, the work vehicle can assume a FWD-only mode of operation "on the fly" while the vehicle is moving along a surface (i.e., without requiring the vehicle to stop) simply by switching the drive-request input device to an "on" position requesting FWD-only operation and shifting the transmission shifter of the vehicle to one of a number of predetermined speed ratio settings (e.g., forward first gear, forward second gear, or forward third gear). Further, the work vehicle can be switched back to a FWD-and-RWD mode of operation again "on the fly" simply by either switching the drive-request input device to an "off" position or shifting the transmission shifter to assume a speed ratio setting other than one of the predetermined speed ratio settings (e.g., anything but forward first, second, or third gear such as, for example, any reverse gear or a forward gear higher than third gear).

An associated method is disclosed. Exemplarily, the method comprises monitoring for a speed ratio setting request signal and for a FWD-only request signal, determining from the speed ratio setting request signal if a requested speed ratio setting represented thereby is one of at least one predetermined speed ratio setting among a plurality of speed ratio settings possible for the work vehicle upon receipt of the FWD-only request signal, and, if so, outputting at least one control signal engaging a FWD-only mode enabling FWD operation of the work vehicle but disabling RWD operation of the work vehicle.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
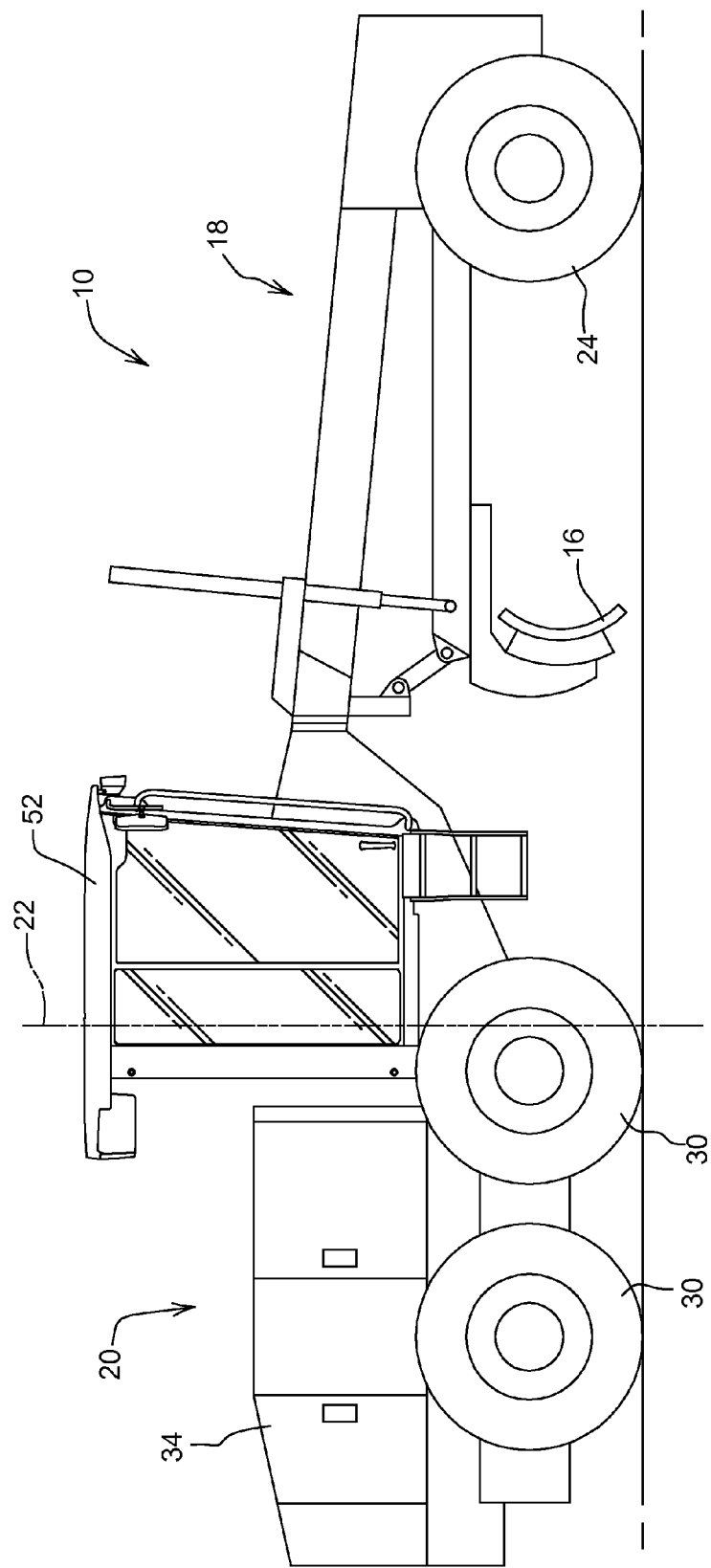
FIG. 1 is a side elevational view of a work vehicle in the form of, for example, a motor grader.
Figure 2:
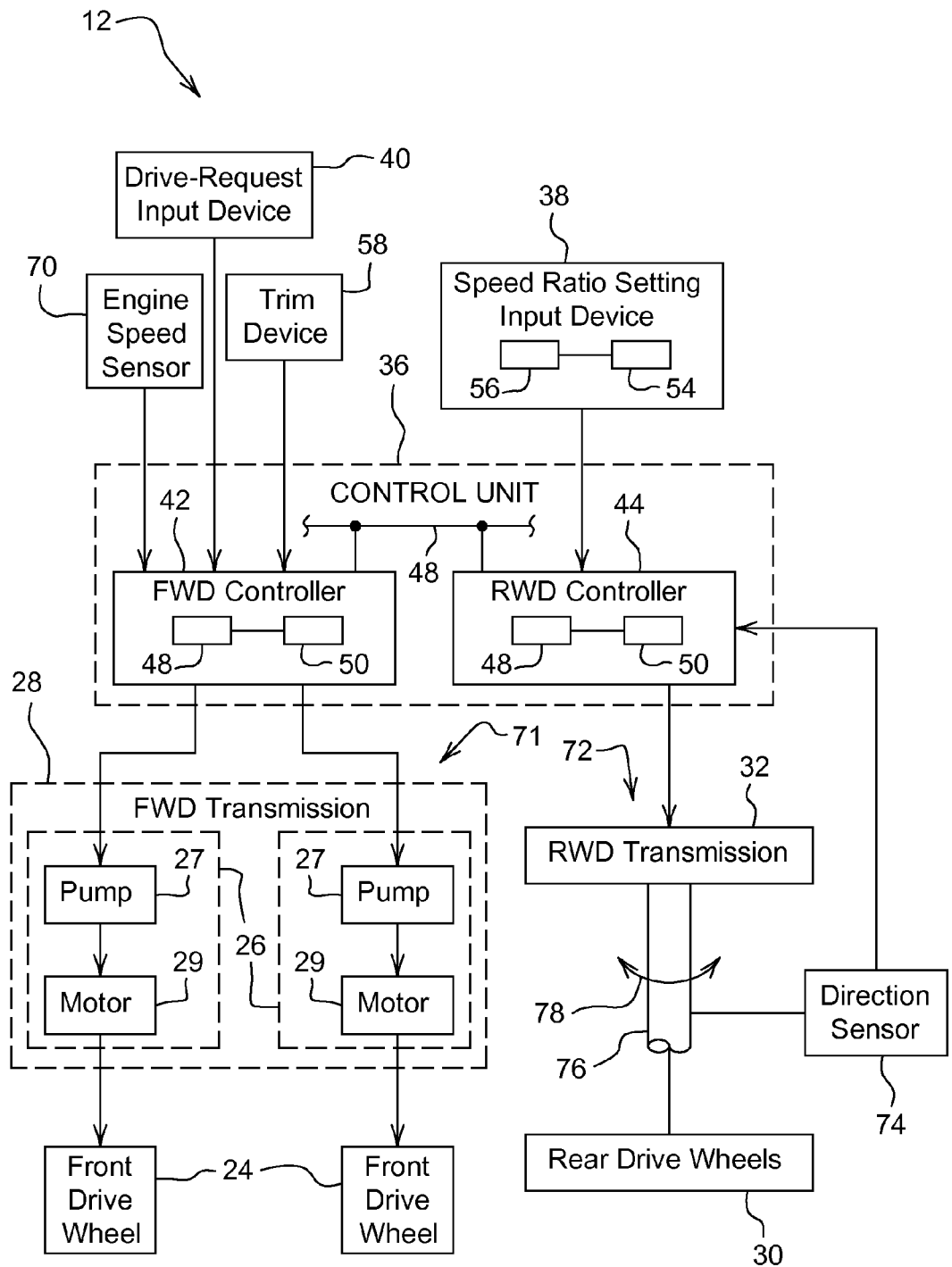
FIG. 2 is a diagrammatic view showing a drive system for the work vehicle.
Figure 3:
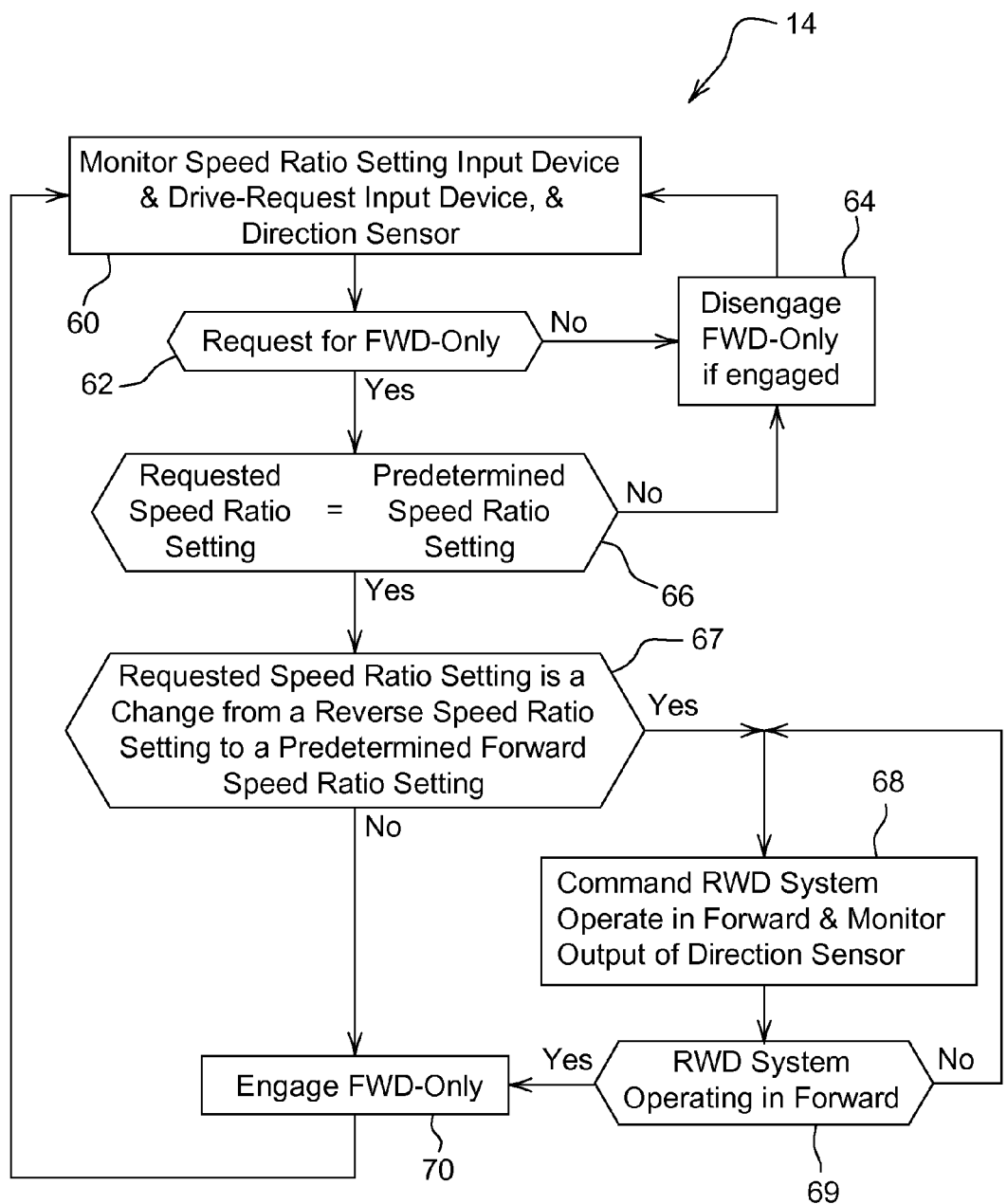
FIG. 3 is a view of a control routine to be performed by a control unit of the drive system.

Referring to FIG. 1, there is shown a work vehicle 10 which has a drive system 12 shown in FIG. 2 for controlling whether a FWD-only mode of operation is engaged according to a control routine 14 shown in FIG. 3.

Exemplarily, the work vehicle 10 is illustrated as a motor grader. In such a case, the motor grader has a moldboard or blade 16 for grading material. The moldboard 16 is part of a front section 18 of the motor grader, the front section 18 being articulated to a rear section 20 for relative movement between the sections 18, 20 about an articulation axis 22.

The front section 18 has a pair of front drive wheels 24 (one shown in FIG. 1). Each front drive wheel 24 is driven, for example, by an associated hydrostatic transmission 26. Each hydrostatic transmission 26 has a pump 27 and motor 29. The pumps 27 are mechanically operated by an engine 74 housed in an engine compartment 34 on the rear section 20. Such operation of the pumps 27, in turn, operate the motors 29 to drive the wheels 24. The two hydrostatic transmissions 26 cooperate to provide a FWD transmission 28, as shown, for example, in FIG. 2. In some embodiments, the transmission 28 may be a single-path hydrostatic transmission serving both front wheels 24 instead of the illustrated dual-path hydrostatic transmission. More generally, in some embodiments, the FWD transmission 28 may take the form of something other than a hydrostatic transmission such as, for example, a direct drive, a torque converter, or an electric drive, to name but a few.

The rear section 20 has a pair of tandem arrangements, one on each side of the rear section 20 as shown with respect to one of the tandem arrangements in FIG. 1. Each tandem arrangement has a pair of rear drive wheels 30. The rear drive wheels 30 are driven by a RWD transmission 32 (e.g., a direct drive transmission) operated by the engine 74. The RWD transmission 32 may take the form of something other than a direct drive transmission such as, for example, a hydrostatic transmission, a torque converter, or an electric drive, to name but a few.

The work vehicle 10 may be operated in a number of different drive modes. For example, it may be operated in a FWD-and-RWD mode, a RWD-only mode, or a FWD-only mode. In the FWD-and-RWD mode, both FWD operation and RWD operation are enabled (e.g., all-wheel-drive). In the RWD-only mode, RWD operation is enabled but FWD operation is disabled. In the FWD-only mode, FWD operation is enabled but RWD operation is disabled. The FWD-only mode may be engaged and disengaged as discussed below in connection with FIGS. 2 and 3. It is to be understood that, in each of these modes, all or less than all of the wheels of the applicable enabled section 18, 20 may act as drive wheels.

Referring to FIG. 2, the drive system 12 comprises a control unit 36 which receives inputs from a speed ratio setting input device 38 and a drive-request input device 40 and generates outputs to the FWD and RWD transmissions 28, 32. In particular, the control unit 36 is arranged for communication with the speed ratio setting input device 38 and the drive-request input device 40 and is adapted to: monitor output of the speed ratio setting input device 38 for a speed ratio setting request signal and output of the drive-request input device 40 for a FWD-only request signal, determine from the speed ratio setting request signal if a requested speed ratio setting represented thereby is one of at least one predetermined speed ratio setting among a plurality of speed ratio settings possible for the work vehicle 10 upon receipt of the FWD-only request signal, and, if so, output at least one control signal engaging a FWD-only mode enabling FWD operation of the work vehicle 10 but disabling RWD operation of the work vehicle 10.

The control unit 36 may be configured in a variety of ways. For example, in some embodiments, the control unit 36 may be a single electronic controller. In other embodiments, the control unit 36 may comprise multiple electronic controllers interconnected for communication therebetween. Illustratively, the control unit 36 is configured as a controller network including an electronic FWD controller 42, an electronic RWD controller 44 (which may also be referred to as the transmission controller), and a communications bus 46 [e.g., controller area network (CAN) bus] interconnecting the controllers 42 and 44 for communication therebetween. Each controller 42, 44 includes a processor 48 and a memory 50, the memory 50 having a plurality of instructions stored therein which, when executed by the processor 48, cause the processor 48 to perform the various functions of the respective controller 42, 44.

The speed ratio setting input device 38 is located, for example, at an operator's station 52 of the vehicle 10 for actuation by the operator to establish the speed ratio setting of the vehicle 10. Exemplarily, the speed ratio setting input device 38 includes a transmission shifter 54 and a shifter position sensor 56. An operator requests a speed ratio setting for the vehicle 10 by movement of the shifter 54 to a position corresponding to the requested speed ratio setting. The sensor 56 senses the position of the shifter 54 and outputs a requested speed ratio setting signal representative of the requested speed ratio setting to the RWD controller 44. The RWD controller 44 monitors the output of the sensor 56 for the requested speed ratio setting signal.

The drive-request input device 40 may also be located at the operator's station 52 for actuation by the operator to enable activation of the FWD-only mode. The drive-request input device 40 may be configured, for example, as an on-off rocker switch. Switching to the on position enables activation of the FWD-only mode whereas switching to the off position disables activation of the FWD-only mode. The FWD controller 42 monitors output of the drive-request input device for the FWD-only request signal.

From time to time, the vehicle operator may request that the speed ratio setting change from a reverse speed ratio setting to a predetermined forward speed ratio setting to effect a change in direction of the vehicle 10 from reverse to forward and, at the same time, request FWD-only mode. However, if the vehicle 10 were to engage the FWD-only mode immediately upon such a change request, the FWD system 71 under the control of the FWD controller 42 may not be able to generate sufficient tractive effort through the FWD transmission 28 and front drive wheel(s) 24 to accomplish the direction change from reverse to forward, possibly resulting in undesirable skidding or spinning of the front drive wheel(s) 24 and/or excessive vehicle roll-out in the reverse direction.

The vehicle 10 may be configured to address this situation. Instead, of automatically immediately engaging the FWD-only mode, the modified control routine 114 waits until the RWD 72 starts to operate in the forward direction. Once that occurs, the FWD-only mode is engaged.

In particular, the control unit 36 is adapted to determine if (i) the FWD-only mode is requested based on the FWD-only request signal, (ii) the requested speed ratio setting is changed from a reverse speed ratio setting to a predetermined forward speed ratio setting of the at least one predetermined speed ratio setting (e.g., first, second, or third forward gears of the RWD transmission 32) based on the speed ratio setting request signal, and (iii) the RWD system 72 of the vehicle 10 under the control of the RWD controller 44 is operating in the forward direction. If those conditions [i.e., conditions (i), (ii), and (iii)] are met, the control unit 36 is adapted to output at least one control signal engaging the FWD-only mode.

To determine if the requested speed ratio setting is changed from a reverse speed ratio setting to a predetermined forward speed ratio setting, the RWD controller 44 monitors output of the shifter position sensor 56 for a shifter position signal representing the position of the transmission shifter 54. The RWD controller 44 determines from this signal if the shifter 54 has been switched from a reverse speed ratio setting to one of the predetermined forward speed ratio settings (e.g., first, second, or third forward gears).

A direction sensor 74 may be employed to sense a direction 78 of operation (i.e., forward or reverse) of the RWD system 72. In such a case, the RWD controller 44 monitors output of the direction sensor 74 for a direction signal representative of the direction in which the RWD system 72 is operating and determines from the direction signal if the RWD system 72 of the vehicle 10 is operating in the forward direction.

The direction sensor 74 may be associated with a transmission output shaft 76 of the RWD transmission 32 to sense the direction 78 (i.e., forward or reverse) of the shaft 76 and output the direction signal representative thereof to the RWD controller 44. The direction sensor 74 may be, for example, a shaft speed sensor capable of sensing the direction in which the shaft is rotating. In other examples, the direction sensor 74 may include other sensors including, but not limited to, one or more of a clutch pressure sensor, front tire speed, and/or the like.

Once the control unit 36 determines that the RWD system 72 is operating in the forward direction (e.g., the transmission output shaft is rotating in the forward direction), the RWD controller 44 outputs a control signal to the RWD transmission 32 causing the RWD transmission 32 to go to neutral, disabling RWD operation. Further, the FWD controller 42 outputs at least one control signal to the FWD transmission 28 (e.g., a control signal to each pump 27) engaging FWD operation. Such FWD operation may be a continuation of FWD operation in reverse or may be the commencement of FWD operation. In either case, the FWD-only mode is thus assumed.

Referring to FIG. 3, there is shown a control routine 14 performed by the control unit 36. In act 60, the control unit 36 monitors output of the speed ratio setting input device 38 for the speed ratio setting request signal, output of the drive-request input device 40 for the FWD-only request signal, and output of the direction sensor 74 for the direction signal. In particular, the RWD controller 44 monitors the output of the shifter position sensor 56 for the speed ratio setting request signal, and the output of the direction sensor 74 for the direction signal. The FWD controller 42 monitors output of the drive-request input device 40 for the FWD-only request signal.

In act 62, the control unit 36 determines if there is a request for FWD-only (e.g., the operator has switched the rocker switch to its on position). If no, the control routine 14 returns to act 60. In doing so, if the FWD-only mode had already been engaged, the control unit 36 disengages the FWD-only mode and engages, for example, the FWD-and-RWD mode in act 64 prior to return to act 60. If there is a FWD-only request, in response to receipt of the FWD-only request signal, the FWD controller 42 broadcasts a FWD-only message to the RWD controller 44 via the communications bus 48 to inform the RWD controller 44 that there is a FWD-only request. Upon receipt of this message, the RWD controller 44 determines that there is a FWD-only request and the control routine 14 advances to act 66.

In act 66, the control unit 36 determines from the speed ratio setting request signal if a requested speed ratio setting represented thereby is one of at least one predetermined speed ratio setting among a plurality of speed ratio settings possible for the work vehicle 10 upon receipt of the FWD-only request signal. If no, the control routine 14 returns to act 60, performing act 64 on its way to act 60 if applicable. If yes, the control routine 14 advances to act 67.

The at least one predetermined speed ratio setting is, for example, a plurality of predetermined speed ratio settings, the plurality of predetermined speed ratio settings being only a portion of the speed ratio settings possible for the work vehicle 10. In some embodiments, the plurality of predetermined speed ratio settings are the first three forward speed ratio settings of the vehicle 10 (e.g., first, second, and third forward gears). The number of total speed ratio settings possible for the vehicle 10 depends on the type of vehicle at issue. For example, in the context of a motor grader, there may be eight forward speed ratio settings and eight reverse speed ratio settings, such that movement of the shifter 54 to any of the first three forward speed ratio settings is a condition for engagement of the FWD-only mode. In some embodiments, the plurality of predetermined speed ratio settings may include any one or more reverse speed ratio settings in which case the vehicle 10 would operate in reverse in the FWD-only mode.

In act 67, the control unit 36 determines if the requested speed ratio setting was changed from a reverse speed ratio setting to a predetermined forward speed ratio setting of the at least one predetermined speed ratio setting (e.g., from any reverse gear to one of the first, second, or third forward gears). If no, the control routine 14 advances to act 69 for engagement of the FWD-only mode. If yes, the control routine 14 advances to act 68.

In act 68, the control unit 36 (e.g., the RWD controller 44) outputs at least one control signal operating the RWD system 72 in forward, such that at least RWD operation in forward is engaged, whether the FWD system 72 is operated or not (i.e., in FWD-and-RWD mode or in RWD-only mode). Further, in act 68, the control unit 36 (e.g., the RWD controller 44) continues to monitor output of the direction sensor 74 for the direction signal and thus the direction of operation of the RWD system 72 (e.g., the transmission output shaft 76). The control routine 14 advances to act 69.

In act 69, the control unit 36 determines if the RWD system 72 is operating in the forward direction. Exemplarily, the RWD controller 44 determines from the direction signal of the direction sensor 74 if the transmission output shaft 76 (or other directional component) is rotating in the forward direction. If no, the control unit 36 loops back to act 68, so as to continue to command RWD operation in the forward direction and monitor output of the direction sensor 74 to determine, thus delaying engagement of the FWD-only mode until the RWD system 72 begins to operate in forward. If yes, the control routine 14 advances to act 70. In the motor grader context, this means that the rear tandem arrangements will be commanded to operate in the forward direction until it is detected that they have begun to operate in the forward direction by virtue of rotation of the shaft 76 in the forward direction, after which they can be disengaged (by putting the transmission in neutral) for engagement of the FWD-only mode.

In act 70, the control unit 36 outputs at least one control signal engaging the FWD-only mode enabling FWD operation of the work vehicle 10 but disabling RWD operation of the work vehicle 10. In particular, the FWD controller 42 outputs control signals commanding operation of the FWD transmission 28 such that the pumps 27, which are powered by the engine 74, drive the front wheels 24 through the motors 29 while the RWD controller 44 outputs a control signal commanding the RWD transmission to neutral so as to disengage the rear wheels 30 from the engine 74.

While the FWD-only mode is engaged, the control routine 14 loops back to act 60 where the control unit 36 continues to monitor output of the devices 38 and 40. If, at some point, either the drive-request input device 40 ceases to signal a FWD-only mode request (act 62) or the speed ratio setting input device 38 ceases to output a signal representative of any of the predetermined speed ratio setting(s) (e.g., first, second, or third forward gears) (act 66), the control unit 36 will in act 64 disengage the FWD-only mode and engage either the FWD-and-RWD mode (e.g., six-wheel-drive mode on the motor grader) or the RWD-only mode (e.g., four-wheel-drive mode on the motor grader) causing the RWD controller 44 to output a control signal commanding the RWD transmission 32 to assume a speed ratio setting based on the input from the speed ratio setting input device 38.

When in the FWD-only mode, ground speed may be adjusted by use of a trim device 58. In particular, the trim device 58 may be located at the operator's station 52 for precision adjustment of the speed ratio setting selected by the operator upon manipulation of the shifter 54. The trim device 58 may be configured, for example, as a 15-position rotary dial, the output of which is monitored by the FWD controller 42. In response to the output of the trim device 58, the FWD controller 42 may output control signals to the pumps 27 to cause precision adjustment of the requested speed ratio setting, resulting in an adjustment of the ground speed.

In the example of the rotary dial, position 15 of the rotary dial may be set so as not to command any adjustment whereas the other positions may be set to command a corresponding adjustment, position 1 resulting in the greatest adjustment (i.e., the minimum speed). Exemplarily, at an engine speed of about 1200 rpm (revolutions per minute) with the trim device 58 in its lowest speed position (e.g., position 1 in the case of the rotary dial example), the ground speed in first forward gear may be about 1.4 mph (miles per hour) in FWD-and-RWD mode but only about 0.4 to about 0.5 mph in FWD-only mode, the ground speed in second forward gear may be about 1.9 mph in FWD-and-RWD mode but only about 0.75 to about 1.0 mph in FWD-only mode, and the ground speed in third forward gear may be about 2.5 mph in FWD-and-RWD mode but only about 1.5 to about 2.0 mph in FWD-only mode.

Ground speed in the FWD-only mode may also be affected by engine speed. In such a case, an electronic engine controller 72 included in the control unit 36 for control of the engine 74 monitors output of an engine speed sensor 70 for an engine speed signal representative of the engine speed of the engine 74. The engine controller 72 communicates this engine speed over the communications bus 74 to the FWD controller 42 which then may output control signals to the pumps 27 to vary the displacement setting of the pumps 27 (e.g., swashplate angle) in view of the engine speed so as to adjust the ground speed of the vehicle 10.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of operating a work vehicle, comprising:
monitoring for a speed ratio setting request signal and for a front-wheel-drive (FWD)-only request signal,
determining from the speed ratio setting request signal if a requested speed ratio setting represented thereby is one of at least one predetermined speed ratio setting among a plurality of speed ratio settings possible for the work vehicle upon receipt of the FWD-only request signal,
if so, outputting at least one control signal engaging a FWD-only mode enabling FWD operation of the work vehicle but disabling rear-wheel-drive (RWD) operation of the work vehicle, and
determining if (i) the FWD-only mode is requested, (ii) the requested speed ratio setting is changed from a reverse speed ratio setting to a predetermined forward speed ratio setting of the at least one predetermined speed ratio setting, and (iii) a RWD system of the work vehicle is operating in the forward direction, and if those conditions are met, outputting the at least one control signal engaging the FWD-only mode.

2. The method of claim 1, wherein the work vehicle comprises a transmission shifter and a shifter position sensor for sensing the position of the transmission shifter, and the monitoring comprises monitoring output of the shifter position sensor for the speed ratio setting request signal.

3. The method of claim 1, wherein the monitoring comprises a RWD controller monitoring for the speed ratio setting request signal, and a FWD controller monitoring for the FWD-only request signal and broadcasting a FWD-only request message to the RWD controller via a communications bus upon receipt of the FWD-only request signal.

4. The method of claim 3, wherein the determining comprises the RWD controller performing the determining.

5. The method of claim 1, wherein the determining comprises determining if the requested speed ratio setting is one of a plurality of predetermined speed ratio settings, the plurality of predetermined speed ratio settings being only a portion of the speed ratio settings possible for the work vehicle.

6. The method of claim 1, wherein the plurality of speed ratio settings comprises more than three forward speed ratio settings, and the determining comprises determining if the requested speed ratio setting is one of the three lowest forward speed ratio settings of the more than three forward speed ratio settings.

7. The method of claim 1, wherein the outputting comprises outputting a control signal commanding a RWD transmission to neutral if the requested speed ratio setting is one of the at least one predetermined forward speed ratio setting upon receipt of the FWD-only request signal.

8. The method of claim 1, further comprising determining from the speed ratio setting request signal if the requested speed ratio setting represented thereby is other than one of the at least one predetermined forward speed ratio setting upon receipt of the FWD-only request signal, and, if so, outputting at least one control signal engaging a FWD-and-RWD mode enabling FWD and RWD operation of the work vehicle.

9. The method of claim 1, wherein determining if a RWD system of the work vehicle is operating comprises determining if a transmission output shaft is operating in the forward direction.

10. The method of claim 1, wherein, if conditions (i) and (ii) are met but condition (iii) is not met, the outputting comprises outputting a control signal commanding operation of the RWD system in the forward direction until the control unit determines that the RWD system is operating in the forward direction.

11. A drive system for a work vehicle, comprising:
a speed ratio setting input device,
a drive-request input device,
a control unit arranged for communication with the speed ratio setting input device and the drive-request input device, the control unit configured to:
monitor output of the speed ratio setting input device for a speed ratio setting request signal and output of the drive-request input device for a front-wheel-drive (FWD)-only request signal,
determine from the speed ratio setting request signal if a requested speed ratio setting represented thereby is one of at least one predetermined speed ratio setting among a plurality of speed ratio settings possible for the work vehicle upon receipt of the FWD-only request signal, and
if so, output at least one control signal engaging a FWD-only mode enabling FWD operation of the work vehicle but disabling rear-wheel-drive (RWD) operation of the work vehicle,
a RWD system under the control of the control unit, and
a direction sensor for sensing in which direction, forward or reverse, the RWD system is operating, wherein the control unit is configured to:
determine if (i) the FWD-only mode is requested, (ii) the requested speed ratio setting is changed from a reverse speed ratio setting to a predetermined forward speed ratio setting of the at least one predetermined speed ratio setting, and (iii) the RWD system is operating in the forward direction, and
if those conditions are met, output the at least one control signal engaging the FWD-only mode.

12. The drive system of claim 11, wherein the speed ratio setting input device comprises a transmission shifter and a shifter position sensor for sensing the position of the transmission shifter, and the control unit is configured to monitor output of the shifter position sensor for the speed ratio setting request signal.

13. The drive system of claim 12, wherein the control unit comprises a RWD controller, a FWD controller, and a communications bus interconnecting the RWD controller and the FWD controller, the RWD controller is configured to monitor output of the shifter position sensor for the speed ratio setting request signal, and the FWD controller is configured to monitor output of the drive-request input device for the FWD-only request signal and to broadcast a FWD-only request message to the RWD controller via the communications bus upon receipt of the FWD-only request signal.

14. The drive system of claim 13, wherein the RWD controller is configured to determine from the speed ratio setting request signal if the requested speed ratio setting represented thereby is one of the at least one predetermined forward speed ratio setting upon receipt of the FWD-only request signal.

15. The drive system of claim 11, wherein the control unit is configured to determine if the requested speed ratio setting is one of a plurality of predetermined speed ratio settings, the plurality of predetermined speed ratio settings being only a portion of the speed ratio settings possible for the work vehicle.

16. The drive system of claim 11, wherein the plurality of speed ratio settings comprises more than three forward speed ratio settings, and the control unit is configured to determine if the requested speed ratio setting is one of the three lowest forward speed ratio settings of the more than three forward speed ratio settings.

17. The drive system of claim 11, wherein the control unit is configured to determine if the requested speed ratio setting is a reverse speed ratio setting.

18. The drive system of claim 11, wherein the control unit is configured to output a control signal commanding a RWD transmission to neutral if the requested speed ratio setting is one of the at least one predetermined forward speed ratio setting upon receipt of the FWD-only request signal.

19. The drive system of claim 11, wherein the control unit is configured to determine from the speed ratio setting request signal if the requested speed ratio setting represented thereby is other than one of the at least one predetermined forward speed ratio setting upon receipt of the FWD-only request signal, and, if so, output at least one control signal engaging a FWD-and-RWD mode enabling FWD and RWD operation of the work vehicle.

20. The drive system of claim 11, wherein the RWD system comprises a transmission output shaft, the direction sensor is arranged to sense in which direction, forward or reverse, the transmission output shaft is rotating, and the control unit is configured to monitor output of the direction sensor for a direction signal representative of the direction of rotation of the transmission output shaft and determine if the transmission output shaft is operating in the forward direction.

21. The drive system of claim 11, wherein, if conditions (i) and (ii) are met but condition (iii) is not met, the control unit is configured to output a control signal commanding operation of the RWD system in the forward direction until the control unit determines that the RWD system is operating in the forward direction.

22. The drive system of claim 11, in combination with the work vehicle such that the drive system is included in the work vehicle.

23. The drive system of claim 11, in combination with the work vehicle, wherein the work vehicle is a motor grader such that the drive system is included in the motor grader.

* * * * *